(12) United States Patent  (10) Patent No.: US 8,950,951 B2
Lin  (45) Date of Patent: Feb. 10, 2015

(54) OPTICAL SUB-ASSEMBLY AND PACKAGING METHOD THEREOF

(71) Applicant: Optomedia Technology Incorporation, Hsinchu County (TW)

(72) Inventor: Tung-Lou Lin, Hsinchu County (TW)

(73) Assignee: Optomedia Technology Incorporation, Hsinchu County (TW)

( * ) Notice: Subject to any disclaimer, the term of this patent is extended or adjusted under 35 U.S.C. 154(b) by 0 days.

(21) Appl. No.: 14/076,996

(22) Filed: Nov. 11, 2013

(65) Prior Publication Data

US 2014/0199032 A1   Jul. 17, 2014

(30) Foreign Application Priority Data

Jan. 17, 2013  (TW) .............................. 102101802 A
Aug. 15, 2013  (TW) .............................. 102129353 A

(51) Int. Cl.
  *G02B 6/36*    (2006.01)
  *G02B 6/42*    (2006.01)

(52) U.S. Cl.
  CPC .............. *G02B 6/4228* (2013.01); *G02B 6/423* (2013.01); *G02B 6/4246* (2013.01); *G02B 6/4292* (2013.01); *G02B 6/428* (2013.01)
  USPC ................... 385/92; 385/93; 385/94

(58) Field of Classification Search
  CPC .... G02B 6/4204; G02B 6/423; G02B 6/4239; G02B 6/4262

USPC ....................................................... 385/92–94
See application file for complete search history.

(56) References Cited

U.S. PATENT DOCUMENTS

| | | | | |
|---|---|---|---|---|
| 6,015,239 | A  * | 1/2000 | Moore ............................ | 385/92 |
| 6,283,644 | B1 * | 9/2001 | Gilliland et al. ................. | 385/93 |
| 6,302,596 | B1 * | 10/2001 | Cohen et al. .................... | 385/93 |
| 2004/0076383 | A1 * | 4/2004 | Peng et al. ....................... | 385/92 |
| 2006/0056781 | A1 * | 3/2006 | Okada et al. .................... | 385/93 |
| 2006/0159406 | A1 * | 7/2006 | Nishie et al. .................... | 385/92 |

* cited by examiner

*Primary Examiner* — Ryan Lepisto
(74) *Attorney, Agent, or Firm* — WPAT, P.C; Anthony King; Kay Yang

(57) ABSTRACT

The present invention discloses an optical sub-assembly (OSA) comprising: a base; at least one photoelectric component; and a housing. The base includes an alignment part including an upper surface and a side surface; the side surface includes a first surface and a second surface; and the first and second surfaces have different curvatures and/or constitute a discontinuous surface. Said photoelectric component is set upon the upper surface for optically connecting to a fiber. Said housing includes a window and an interior surface in which the window is for inserting the fiber, and the interior surface is for defining an accommodation room and includes a third surface and a fourth surface. The accommodation room is capable of containing at least some of the alignment part; meanwhile, the third surface closely meets the first surface and the fourth surface closely meets the second surface.

24 Claims, 5 Drawing Sheets

OPTICAL SUB-ASSEMBLY AND PACKAGING METHOD THEREOF

BACKGROUND OF THE INVENTION

1. Field of the Invention

The present invention relates to an optical device and the packaging method thereof, especially to an optical sub-assembly and the packaging method thereof.

2. Description of Related Art

In recent years, as the demand for data throughput and transmission speed goes up, the traditional way in using copper cables as the data transmission medium is gradually out of date; therefore fiber transmission has taken the place of copper transmission to be the major medium for high speed transmission step by step. However, in comparison with an electric transceiver module applicable to cooper transmission, an optical transceiver module applicable to fiber transmission is relatively expensive. One reason of the high cost is that the optical transceiver module adopts the active alignment process of optical coupling which consumes a lot effort and time; more specifically, said active alignment process has to adjust the position relationship between a fiber and an optical transceiver in multi-axial directions, so as to find out the optimal positions of these components for achieving the best coupling efficiency. Although such active alignment process can reach high optical coupling efficiency, it also consumes much time and cost. On the other hand, the aforementioned optical transceiver module can adopt passive alignment process instead; however, the known passive alignment process has to use etching technique of extremely high cost to etch a substrate for making a V-shape slot on it, so that an optical transceiver and a fiber could be set on the substrate and the V-shape slot respectively to accomplish the position arrangement which is simple but imprecise. Accordingly, in consideration the low position precision and costly etching step, said passive alignment process is not a good option, either.

In addition to the above, the mentioned active alignment process further possess the disadvantages of low design tolerance and being easily affected by heat, shake or shock. Moreover, the well-known TO-CAN (Transistor Outline-Can) type, dual in line type, and butterfly type of optical sub-assembly module all adopt the active alignment process of optical coupling, and consequently inherit the same shortcomings described above.

Therefore, the coupling efficiency and production yield of the current optical transceiver module still have a long way to go. Since the current arts are not good enough and the demand for optical transmission obviously increases, a cost effective, packaging-efficient, and optical-coupling excellent solution is thus greatly expected.

SUMMARY OF THE INVENTION

A purpose of the present invention is to provide an optical sub-assembly and the packaging method thereof to solve the problems of the prior art.

Another purpose of the present invention is to provide an optical sub-assembly and the packaging method thereof related to passive alignment.

A further purpose of the present invention is to provide an optical sub-assembly and the packaging method thereof using an aspherical lens for optical coupling.

The present invention discloses an optical sub-assembly. An embodiment of said optical sub-assembly comprises: a base; at least one photoelectric component; and a housing. The base includes an alignment part which includes an upper surface and a side surface; the side surface includes a first surface and a second surface; and the first and second surfaces have different curvatures respectively and/or constitute a discontinuous surface together. The at least one photoelectric component is set upon or above the upper surface of the base for forming optical coupling with a fiber. The housing includes a window and an interior surface. Said window is for inserting the aforementioned fiber to realize the optical coupling with the at least one photoelectric component; and said interior surface is for defining an accommodation room and includes a third surface and a fourth surface, wherein the accommodation room is capable of containing at least a part of the aforementioned alignment part and covering at least a part of the side surface while the third surface closely meets the first surface and the fourth surface closely meets the second surface.

According to an embodiment of the present invention, the above-mentioned side surface is an ellipsoid surface or a polyhedral surface. Said polyhedral surface is composed of several cambered and/or plane surfaces or a polygonal surface.

According to an embodiment of the present invention, when the aforementioned accommodation room is containing at least some of the base, the relation between the first and third surfaces and the relation between the second and fourth surfaces forbid the housing to rotate or transversely shift in relation to the base.

According to an embodiment of the present invention, the aforementioned fiber is optically coupled with the at least one photoelectric component by at least one lens set inside the housing. An embodiment of the lens is an aspherical lens.

According to an embodiment of the present invention, the aforementioned housing further comprises: an exterior surface; and an exhaust hole connecting the exterior surface and the aforementioned interior surface for discharging the air inside the accommodation room when combining the housing with the base.

The present invention further discloses a packaging method of optical sub-assembly. An embodiment of the method comprises the following steps: providing a base including an alignment part which includes an upper surface and a side surface while the side surface includes a first surface and a second surface having different curvatures respectively and/or constituting a discontinuous surface together; setting at least one photoelectric component upon or above the upper surface of the base; and providing a housing including a window for inserting a fiber to carry out optical coupling with the at least one photoelectric component, and an interior surface defining an accommodation room and including a third surface and a fourth surface, wherein the accommodation room is capable of containing at least some of the base and covering at least a part of the side surface and making the accommodation room of the housing contain at least some of the alignment part of the base, the third surface closely meet the first surface, and the fourth surface closely meet the second surface.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
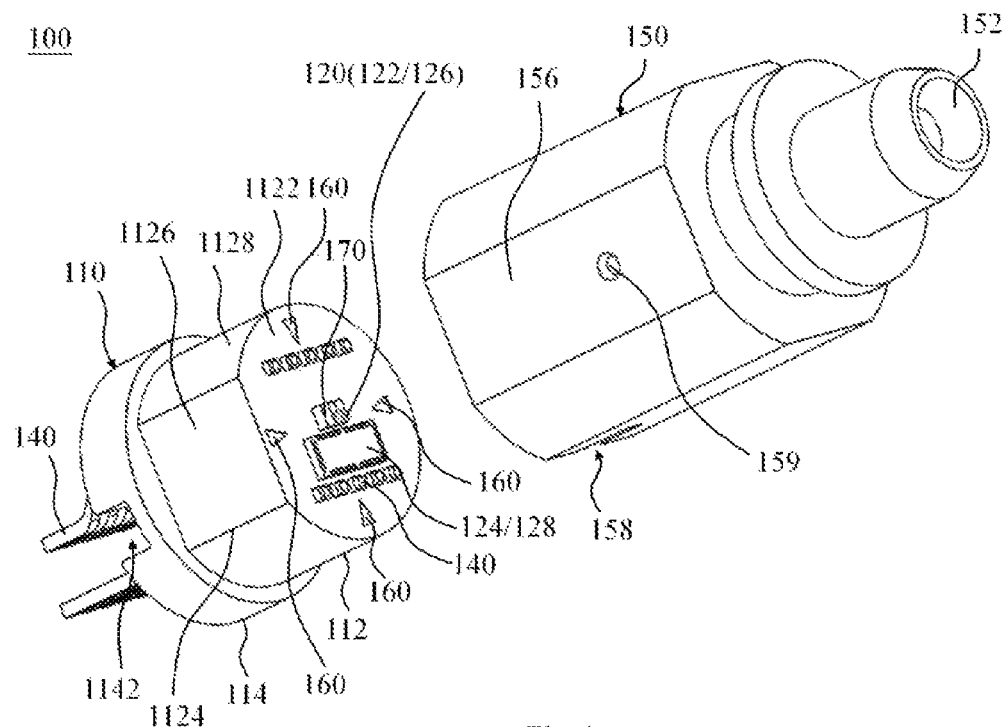
FIG. 1 illustrates an embodiment of the optical sub-assembly of the present invention previous to its assembly.

The present invention claims multiple priorities of TW patent applications (application number: 102101802; and 102129353).

The following description uses language by referring to terms in the field of this invention. If any term is defined in the specification, such term should be explained accordingly. Besides, the connection between objects or events in the disclosed embodiments can be direct or indirect provided that these embodiments are still applicable under such connection. The mentioned "indirect" means that an intermediate object or a physical space is existed between the objects, or an intermediate event or a time interval is existed between the events. In addition, the following description relates to an optical sub-assembly (OSA) and the related packaging method, and the known detail in this field will be omitted if such detail has little to do with the features of the present invention. Furthermore, the shape, size, and scale of any element and the step sequence of any flow chart in the disclosed figures are just exemplary for understanding, not for limiting the scope of this invention.

Furthermore, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention contains an optical sub-assembly and the packaging method thereof. Said assembly and method are applicable to an optical transmitter, an optical receiver or an optical transceiver, and have the advantages of low fabrication cost, less packaging time and high coupling efficiency. Please note that although this specification gives sufficient embodiments, people of ordinary skill in the art can still choose components or steps equivalent to those described in the specification to carry out the present invention, which means that the scope of this invention is not limited to the embodiments in the specification. Besides, since some element by itself of the optical sub-assembly could be known, the detail of such element could be omitted provided that the omission nowhere dissatisfies the disclosure and enablement requirements. Moreover, the packaging method could be applied to the optical sub-assembly of the present invention or the equivalent devices thereof, and carried out through existing packaging equipment in accordance with the disclosure of the present invention. The following description will focus on the steps of the method and abridge the related hardware details provided that the remained disclosure is enough for understanding and enablement.

Figure 2:
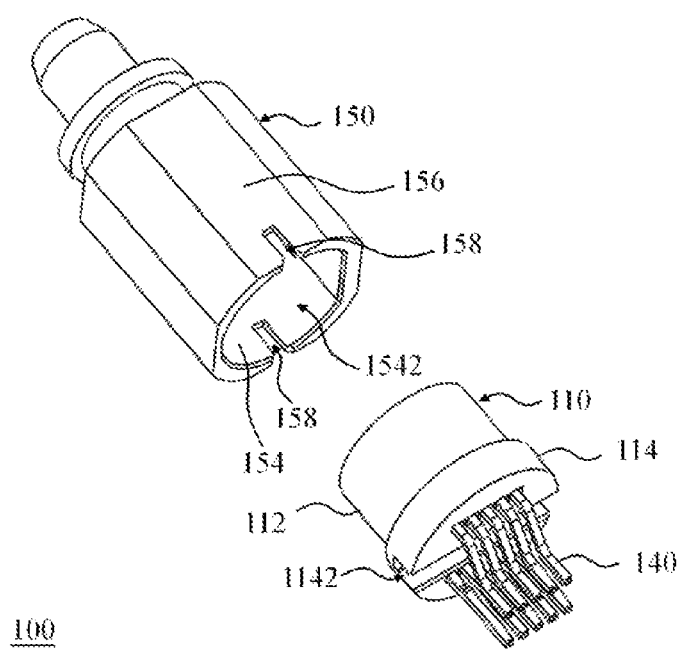
FIG. 2 illustrates the optical sub-assembly of FIG. 1 in another angle of view.
Figure 3:
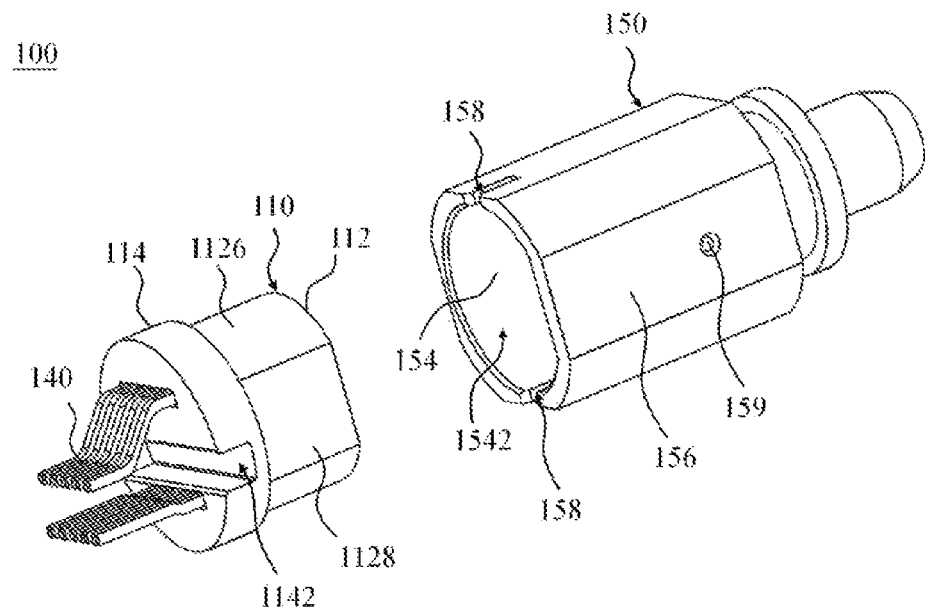
FIG. 3 illustrates the optical sub-assembly of FIG. 1 in yet another angle of view.
Figure 4:
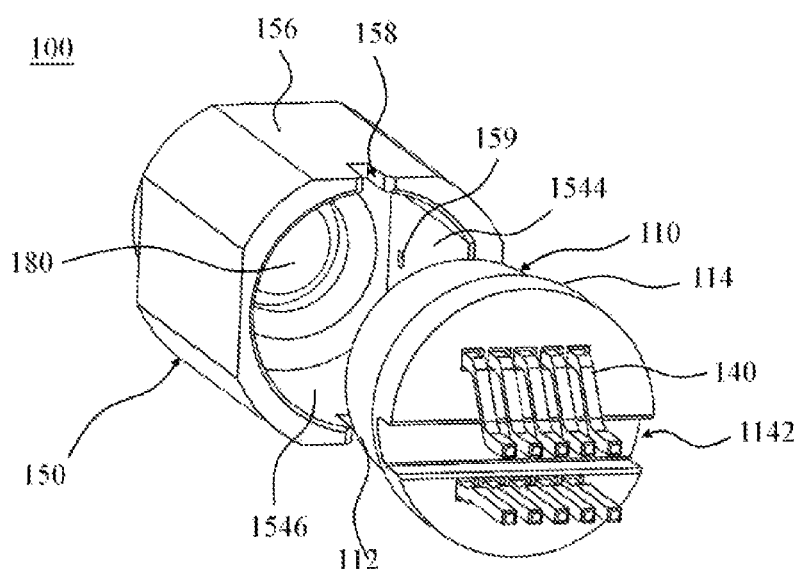
FIG. 4 illustrates the optical sub-assembly of FIG. 1 in a further angle of view.
Figure 5:
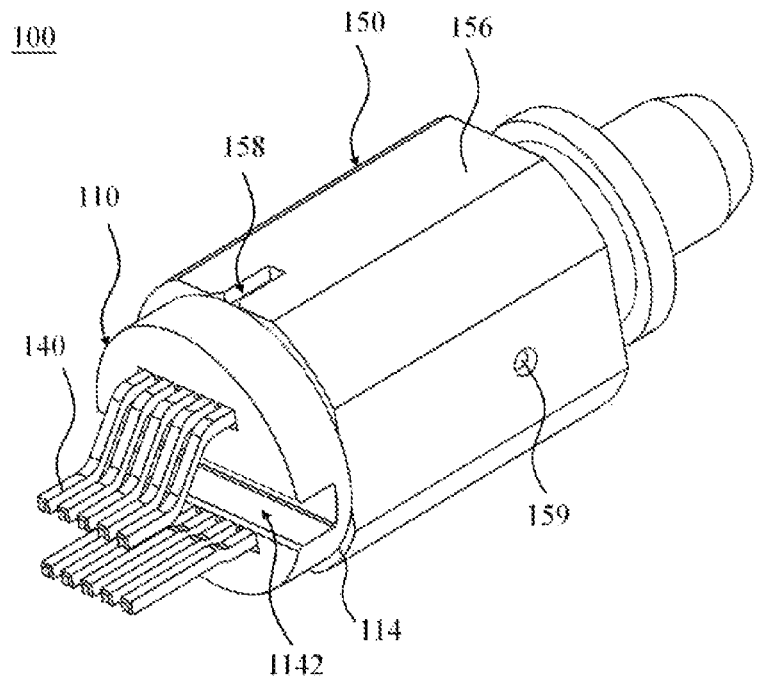
FIG. 5 illustrates the optical sub-assembly of FIG. 1 after its assembly.
Figure 6:
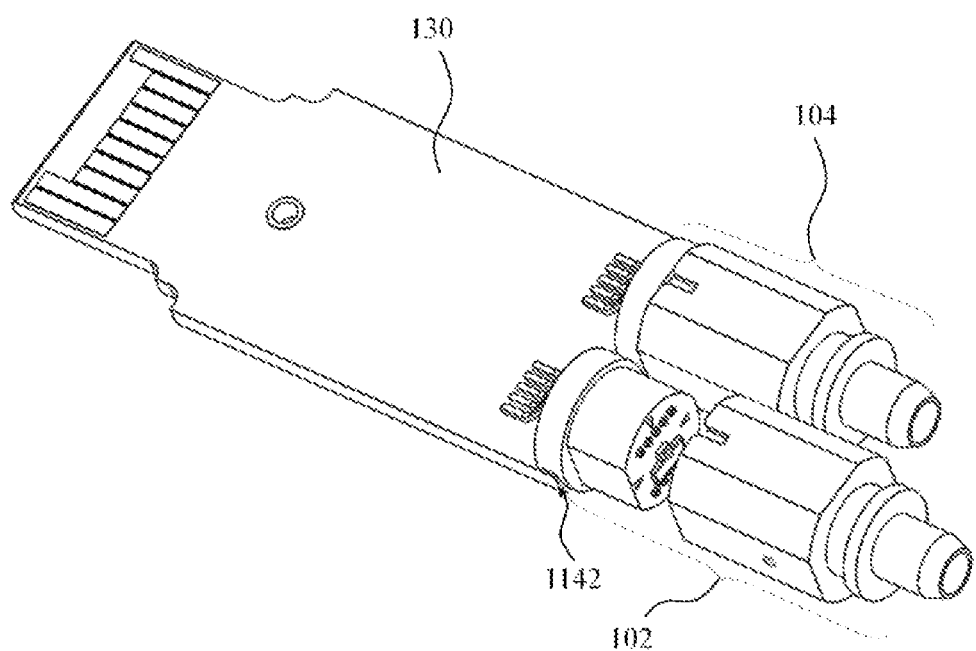
FIG. 6 illustrates an embodiment of an optical transceiver including the optical sub-assembly of FIG. 1 in combination with a circuit board.

Please refer to FIG. 1 to FIG. 6. FIG. 1 illustrates an embodiment of the optical sub-assembly of the present invention previous to its assembly; FIG. 2 to FIG. 4 illustrate the embodiment of FIG. 1 in other angles of view; FIG. 5 illustrates the optical sub-assembly of FIG. 1 after its assembly; and FIG. 6 illustrates the application of this embodiment as an optical transmitter, receiver or transceiver. As shown in the figs., the optical sub-assembly 100 of the present embodiment comprises a base 110. The base 110 includes an alignment part 112 including an upper surface 1122 and a side surface 1124. The upper surface 1122 is for setting at least one photoelectric component 120 while the side surface 1124 includes a first surface 1126 and a second surface 1128. The first surface 1126 and second surface 1128 have different curvatures respectively and/or constitute a discontinuous surface together. In this embodiment, the first surface 1126 and second surface 1128 are a plane surface and a cambered surface respectively; however, this only reflects an option of the implementation of the present invention, which means that other implementation choices including that the side surface 1124 is an ellipsoid or a polyhedral surface which could be composed of several cambered and/or plane surfaces or a polygonal surface could be determined by one of ordinary skill in the art in light of his demand, wherein the above-mentioned polygonal surface could be a triangle surface, a square surface, a rectangular surface, a pentagon surface or a hexagon surface. Besides, said optical sub-assembly 100 also comprises at least one photoelectrical component 120 which could be set upon or above the upper surface 1122 of the base 110 to form an optical coupling with a fiber (not shown). In this embodiment, if the optical sub-assembly 100 is treated as an optical transmitter 102 (as shown in FIG. 6), the at least one photoelectric component 120 includes a photo emitter 122 capable of generating an optical signal according to a driving signal. Said driving signal could be generated by a driving device 124 in accordance with an electric output signal from a rear-end circuit board 130 (as shown in FIG. 6); said driving device 124 could also be set upon or above the upper surface 1122 of the base 110 or on the circuit board 130. The circuit board 130 may electrically connect with the aforementioned optical emitter 122 through one or more conductors 140 (e.g. a plurality of leads, wires and/or pads). On the other hand, if the optical sub-assembly 100 is treated as a photo receiver 104 (as shown in FIG. 6), the at least one photoelectric component 120 includes a photo detector 126 capable of detecting the optical signal transmitted by the aforementioned fiber to thereby generate an electric input signal. This electric input signal could be amplified by an amplifying device 128 and then sent to the rear-end circuit board 130 for following processes. Said amplifying device 128 could also be set upon or above the upper surface 1122 of the base 110 or on the circuit board 130; meanwhile, the circuit board 130 can electrically connect to the photo detector 126 through the aforementioned one or more conductors 140. Of course if the optical sub-assembly 100 is treated as an optical transceiver, the at least one photoelectric component 120 should include all necessary circuits of said optical transmitter 102 and optical receiver 104. Additionally, the optical sub-assembly further comprises a housing 150. The housing 150 includes a window 152 and an interior surface 154. Said window 152 is for inserting the aforementioned fiber to optically connect with the at least one photoelectric component 120. Said interior surface 154 is for defining an accommodation room 1542, and includes a third surface 1544 and a fourth surface 1546 (as shown in FIG. 4). The accommodation room 1542 is to accommodate at least a part of the aforementioned alignment part 112 and cover at least a part of the side surface 1124. Once the housing 150 covers some or all of the base 110 by the accommodation room 1542, the third surface 1544 will closely meet the first surface 1126 of the base 110 while the fourth surface 1546 will closely meet the second surface 1128 of the base 110. Since the first surface 1126 and the second surface 1128 have different curvatures and/or constitute a discontinuous surface as described before, after the accommodation room 1542 receives at least a part of the alignment part 112 (which means it covers at least a part of the side surface 1124), the relation between the first surface 1126 and third surface 1544 with their opposite shapes plus the relation between the second surface 1128 and the fourth surface 1546 with their opposite shapes will forbid the housing 150 to rotate or transversely shift in relation to the base 110, so as to stabilize the coupling relation between the aforementioned fiber and the at least one photoelectric component 120. Please note that in the present embodiment, if the combination of the housing 150 and the base 110 has finished and the fiber has been installed properly, the accommodation room 1542 will then become a sealed room which could be vacuum space, filled with specific gas (e.g. inert gas) or air, or filled with specific material (e.g. plastic material). However, one of ordinary skill in this field can follow his demand or design requirements to make the accommodation room 1542 be accessible through any known ways such as preserved holes, drilling or loose structure.

Please refer to FIG. 1 again. In the present embodiment, the upper surface 1122 of the base 110 has one or more reference marks 160 thereon to define a reference position, so that some or all of the aforementioned at least one photoelectric component 120 could be set in light of the reference marks 160. For instance, said reference marks 160 may comprise a first reference mark 160, a second reference mark 160, a third reference mark 160 and a fourth mark 160 which are formed on the front, back, left and right positions of the upper surface 1122 respectively. Through image detection, infrared detection or other known detection arts, the first and second reference marks 160 can indicate a first virtual line while the third and fourth reference marks 160 can indicate a second virtual line; the cross point of the two virtual lines can then be the aforementioned reference position by which some or all of the at least one photoelectric component 120 can be properly set. Please note that people of ordinary skill in the art can determine the amount, shape and position of the reference marks 160 according to their own demand or design preference. For instance, in another embodiment of the present invention, the amount of the reference mark could be one, the shape could be made in compliance with the bottom perimeter of the at least one photoelectric component 120, and the reference mark itself could be formed at the center of the upper surface 1122, so that the at least one photoelectric component 120 can be set at the center of the upper surface 1122 according to the reference mark.

Please refer to FIG. 1 once more. In the present embodiment, a pad 170 could be set between some or all of the at least one photoelectric component 120 (e.g. the photo emitter 122 or the photo detector 126) and the upper surface 1122 of the base 110. The thickness of the pad 170 could be chosen to improve the optical coupling between the photoelectric component 120 and the aforementioned fiber. To be more specific, by selecting and using the pad 170 with appropriate thickness, the height of the photoelectric component 120 in the longitudinal direction (e.g. the direction perpendicular to the upper surface 1122) could be modified adaptively, so that the photoelectric component 120 could be positioned at the place suitable for optical coupling to thereby increase the coupling efficiency between it and the fiber. Please note that if the coupling efficiency between the fiber and the photoelectric component 120 has reached a user-defined level, the pad 170 is no longer necessary.

Please refer to FIG. 4 which illustrates the optical subassembly 100 of FIG. 1 in another angle of view. As shown in FIG. 4, at least one lens 180 is set inside the housing 150; more specifically, it is set between the aforementioned fiber (which is not installed yet) and the photoelectric component 120 to enhance their coupling efficiency. Said at least one lens 180 could be at least one aspherical lens, at least one spherical lens or any combination based on the above two options. Since a person of ordinary skill in the art is capable of reserving space for setting the at least one lens 180 when forming the housing 150, redundant description will be omitted here provided that such omission has no affection to the disclosure requirement and enablement of the present embodiment. Please also note that in another embodiment of the present invention, the fiber could be directly coupled to the at least one photoelectric component 120 without any lens.

Please refer to FIG. 1 to FIG. 5. As shown in these figs., the housing 150 further includes: an exterior surface 156; and at least one opening 158 which could be in the form of gap, trench, channel or the like. Said opening 158 connects the interior surface 154 and the exterior surface 156 of the housing 150 to store an overflow of glue when combining the housing 150 with the base 110. No doubt people of ordinary skill in the art can determine the amount, position, size and shape of the opening 158 before fabricating the housing 150 in light of their demand or actual applications. In some cases, one can use the housing 150 without any openings; for instance, when the means to combine the housing 150 and the base 110 is not glue or the influence of said overflow can be ignored, no opening is necessary.

Please refer to FIG. 1 and FIG. 3 to FIG. 5. As shown in these figs., the housing 150 further comprises an exhaust hole 159 which connects the exterior surface 156 and the interior surface 154 of the housing 150 to discharge the air inside the housing 150 when combining the base 110 with the housing 150. Similarly, the amount, position, size and shape of the exhaust hole 159 can be determined by those of ordinary skill in the art according to their demand or actual applications. Of course in a practical application, the exhaust hole 159 should not hinder the housing 150 from connecting to the base 110; moreover, people of ordinary skill in the art can adopt a housing without any exhaust hole provided that this will not become a trouble of doing the assemblage.

Please refer to FIG. 1 to FIG. 5 again. In the present embodiment, the base 110 further includes a baffle part 114 which is connected with the alignment part 112 to touch the bottom of the housing 150 and/or be fixed with the housing 150 through a structural design, glue, a welding art (e.g. an ultrasonic welding art) or any appropriate known techniques. The perimeter of said baffle part 114 is longer than the perimeter of the side surface 1124 of the alignment part 112, and longer than the perimeter of the exterior surface 156 of the housing 150, so that the housing 150 will merely cover the alignment part 112 but be stopped by the baffle part 114, which makes the position relationship between the housing 150 and the base 110 constant and thereby has the optical coupling relation predicable. In this embodiment, the baffle part 114 is integrated with the alignment part 112 as a whole; however, the two parts could be two independent but joint parts. In another embodiment of the present invention, the baffle part 114 includes a structure for the housing to be wedged or fixed. In a further embodiment of the present invention, the base 110 has no baffle part, and is capable of being fixed to the housing by a structural design, glue, welding arts, or any available know techniques.

In light of the above, in the present embodiment, the baffle part 114 may further include at least one fastening design which could be fixed to the aforementioned circuit board 130 (as shown in FIG. 6). As shown in FIG. 1 to FIG. 6, said fastening design includes one or more gaps 1142 allowing the circuit board 130 to lodge in the baffle part 114. Certainly, other fastening techniques could be adopted by the present invention to implement the fastening design.

Please refer to FIG. 1 to FIG. 6. In the present embodiment, the material of the base 110 and the housing 150 is plastic. More specifically, the material of the housing 150 could be the material pervious to light. However, those of ordinary skill in the art can choose other material (e.g. metal) as the material of the base 110 and the housing 150 on their own provided that such implementation is still applicable.

Figure 7:
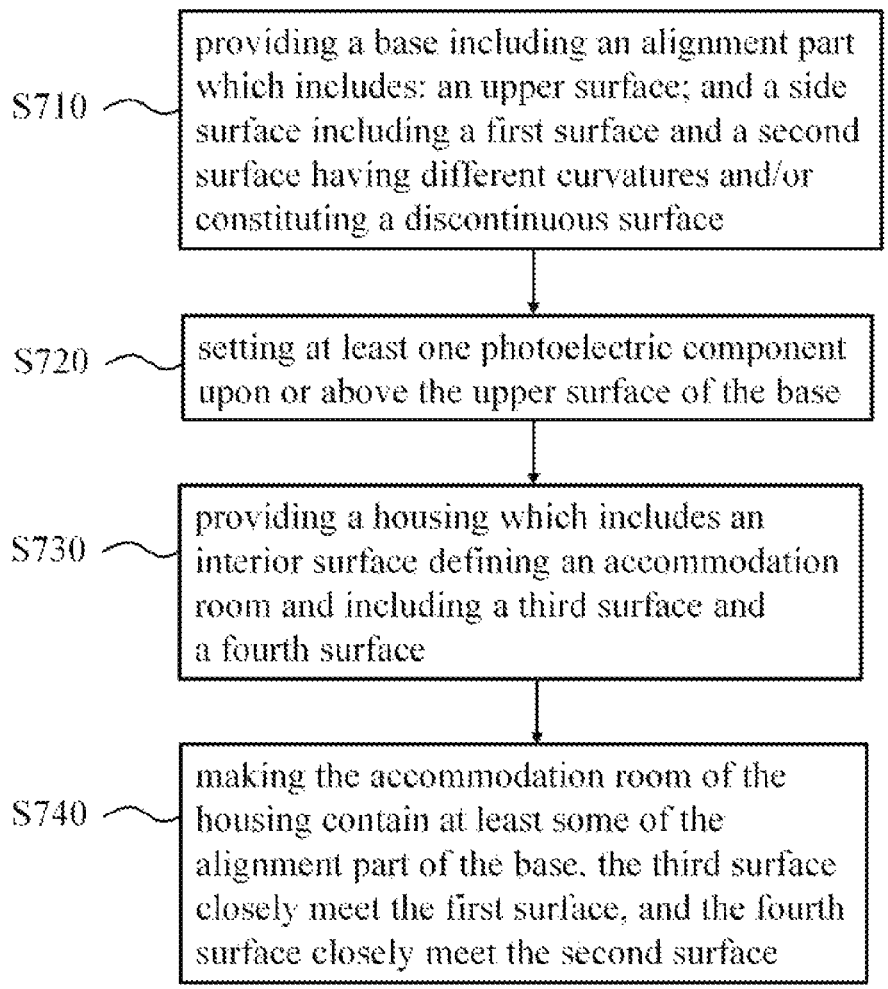
FIG. 7 is a flow chart showing an embodiment of the packaging method of optical sub-assembly of the present invention.

In addition to the above-disclosed optical sub-assembly 100, the present invention also discloses a packaging method of optical sub-assembly. As shown in FIG. 7, an embodiment of the packaging method comprises the following steps:

Step S710: providing a base including an alignment part which includes: an upper surface; and a side surface including a first surface and a second surface having different curvatures respectively and/or constituting a discontinuous surface together. Since one of ordinary skill in the art can refer to the fore disclosure of the device invention to realize the implementation options of said alignment part, repeated or redundant description is therefore omitted here. Besides, in this embodiment, step S710 can be carried out by an insert molding process to provide the base. However, people of ordinary skill in the art can use other known processes such as a plastic molding process (e.g. an injection molding process or a compression molding process) to provide the base.

Step S720: setting at least one photoelectric component upon or above the upper surface of the base. The implementation options or applications of said photoelectric component are well described in the previous paragraphs.

Step S730: providing a housing which includes a window and an interior surface. The window is for inserting a fiber to carry out optical coupling with the at least one photoelectric component of step S720, and the interior surface is to define an accommodation room and includes a third surface and a fourth surface, wherein the accommodation room is capable of containing at least some of the base and covering at least a part of the side surface. Similarly, the implementation options of the housing and changes put on it can be found in the previous description.

Step S740: making the accommodation room of the housing contain at least some of the alignment part of the base, the third surface closely meet the first surface, and the fourth surface closely meet the second surface. In the present embodiment, after step 740 is complete, the relation between the first and third surfaces with their opposite shapes plus the relation between the second and fourth surfaces with their opposite shapes will forbid the housing to rotate or transversely shift in relation to the base, so that the coupling relation between the aforementioned fiber and the at least one photoelectric component is secure.

Figure 8:
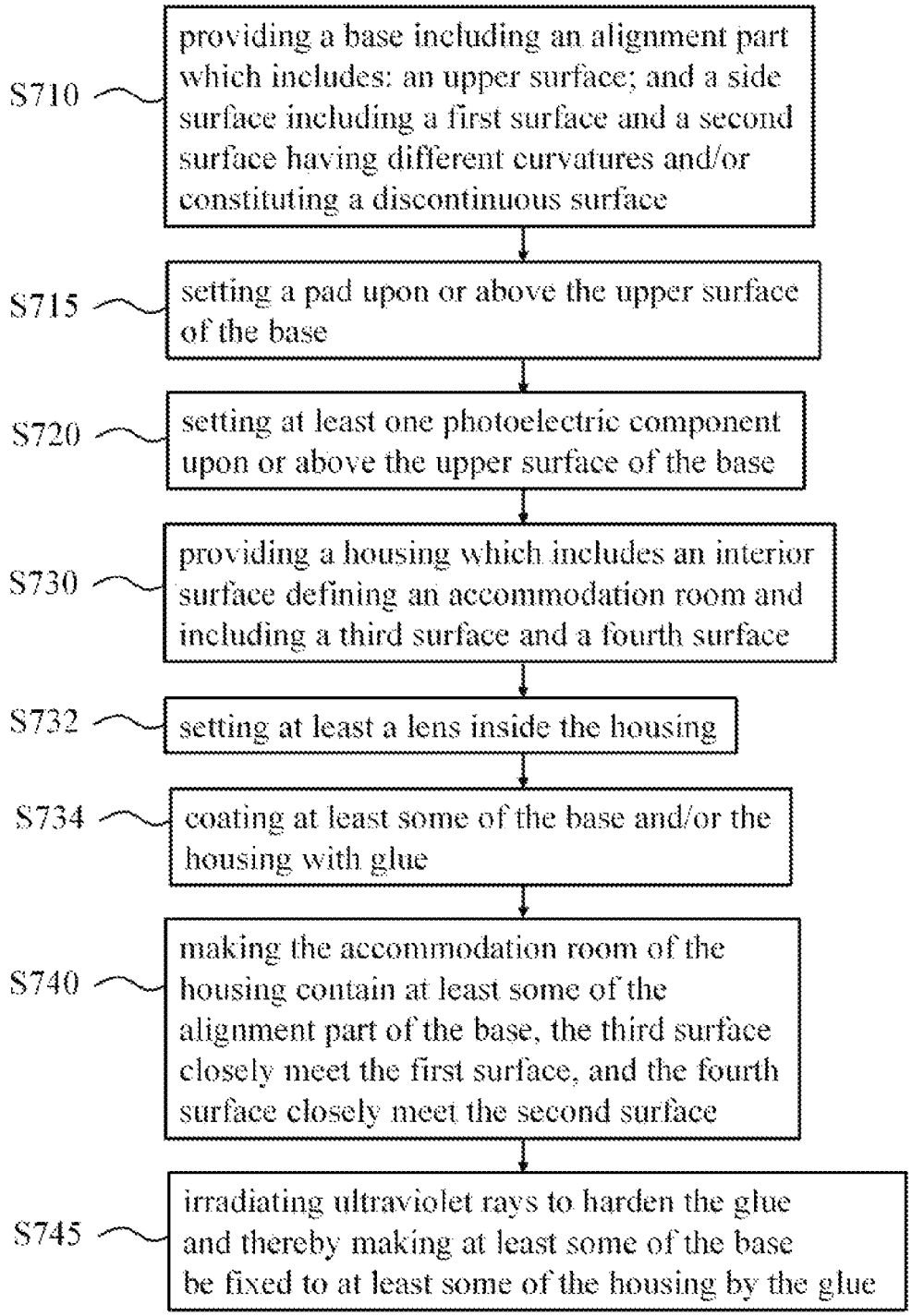
FIG. 8 is a flow chart showing another embodiment of the packaging method of optical sub-assembly of the present invention.

In addition to the above-mentioned steps, this embodiment can further comprise the following steps as shown in FIG. 8:

Step S715: setting a pad upon or above the upper surface of the base, so as to make step S720 set the at least one photoelectric component on the pad, which means that step S720 will set the at least one photoelectric component on the upper surface through the pad. In practice, the thickness selection of the pad can be determined in light of the focus relation between the at least one photoelectric component and the aforementioned fiber; in other words, choosing a pad of wanted thickness can modify the coupling efficiency between the photoelectric component and the fiber. More detail of the pad could be found in the previous description.

Besides, as shown in FIG. 8, the present embodiment can further include the following step:

Step S732: setting at least a lens inside the housing to make the aforementioned fiber be optically coupled with the at least one photoelectric component through the lens. In this embodiment, the lens is an aspherical lens; however, this is not a limitation to the present invention. Other implementation options for the lens could be found in the previous paragraphs.

Please refer to FIG. 8 once more. The present embodiment can further include the following steps:

Step S734: coating at least some of the base (e.g. at least a part of its side surface) and/or the housing (e.g. at least a part of its interior surface) with glue, so as to enhance the joint strength between the base and the housing after executing step S740. The type of said glue can be determined by one of ordinary skill in the art in accordance with his demand; for instance, the glue could be adhesive glue in a thick or dilute state while its adhesive effect could be enhanced through an optical process and/or a thermal process. Said optical process could be a step of irradiating rays with a specific wavelength, and the thermal process could be a step of heating (e.g. baking) or cooling. However, such optical and thermal processes are implementation options instead of a must of the present invention. In this embodiment, said glue is a glue sensitive to ultraviolet, and therefore the embodiment further comprises the following steps:

Step S745: after completing step S740, irradiating ultraviolet rays to harden the glue and thereby making at least some of the base be fixed to at least some of the housing by the glue.

Please note that not only the glue could be used to combine the housing with the base, but also other techniques such as thermal welding, laser welding, ultrasonic welding and/or structural designs could be put to use for realizing the combination. Since a person of ordinary skill in the art can choose one or any combination of the above-mentioned techniques on his own based on the disclosure of this specification, redundant details are omitted here provided that the disclosure and enablement requirements for this invention are satisfied as well.

Please refer to FIG. 7 again. In the embodiment of FIG. 7, step S740 may further comprise:

Step S742 (not shown): using a detecting device to detect the border of the base and thereby generate a detection result. Said detecting device could be a known image detecting device, a known infrared detecting device, or any known applicable detecting device (e.g. a positioning device or an aligning device); and Step S744 (not shown): making the housing cover at least some of the alignment part of the base according to the detection result.

Besides, step S720 of FIG. 7 can set the at least one photoelectric component according to one or more reference marks formed on the upper surface of the base; meanwhile, the aforementioned detecting device could be used to detect the reference marks, so that step S720 can use the detection result to precisely put the at least one photoelectric component at one or more predetermined positions on the upper surface.

Please note that people of ordinary skill in the art can appreciate that the step sequence of the method embodiments in this specification is changeable provided that the consequent implementation is still applicable. Furthermore, the terms of upper, lower, left, right, interior, exterior, longitudinal and the like are relativistic words; other terms which can take place of these relativistic words are also in the scope of the present invention.

To sum up, the optical sub-assembly of the packaging method thereof of the present invention can achieve the advantages of passive optical-coupling alignment and embrace the coupling efficiency of active optical-coupling alignment. In brief, comparing to the prior art, the present invention has the advantages of low cost, less packaging time, and high coupling efficiency.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. An optical sub-assembly comprising:
   a plastic base including an alignment part which includes:
      an upper surface; and
      a side surface including a first surface and a second surface having different curvatures respectively in which the entire border of the upper surface of the plastic base is a partial border of the side surface of the plastic base;
   at least one photoelectric component set upon or above the upper surface of the plastic base for optically connecting to a fiber; and
   a housing, made of material pervious to light, including:
      a window for inserting the fiber to carry out optical coupling with the at least one photoelectric component; and
      an interior surface defining an accommodation room and including a third surface and a fourth surface,
   wherein the accommodation room is capable of containing at least some of the alignment part and covering at least a part of the side surface while the third surface closely meets the first surface and the fourth surface closely meets the second surface.

2. The optical sub-assembly of claim 1, wherein the side surface is an ellipsoid surface or a polyhedral surface.

3. The optical sub-assembly of claim 1, wherein the plastic base is an integral whole made through a plastic molding process.

4. The optical sub-assembly of claim 1, wherein when the accommodation room is containing at least some of the plastic base, the relation between the first and third surfaces and the relation between the second and fourth surfaces forbid the housing to rotate or transversely shift in relation to the plastic base.

5. The optical sub-assembly of claim 1, wherein the at least one photoelectric component includes: an optical detecting component to detect the optical signal delivered by the fiber and thereby generate an electric input signal.

6. The optical sub-assembly of claim 5, further comprising: an amplifying component, set upon or above the upper surface and coupled to the optical detecting component, for amplifying the electric input signal.

7. The optical sub-assembly of claim 1, wherein the at least one photoelectric component includes: an optical emitting component to generate an optical signal according to a driving signal.

8. The optical sub-assembly of claim 7, further comprising: a driving component, set upon or above the upper surface, to generate the driving signal according to an electric input signal.

9. The optical sub-assembly of claim 1, wherein the upper surface includes at least a reference mark for defining a reference position and the at least one photoelectric component is set according to the reference position.

10. The optical sub-assembly of claim 1, wherein the housing further comprises: an exterior surface; and at least an opening connecting the exterior surface and the interior surface to store an overflow of glue for combining the housing with the plastic base.

11. The optical sub-assembly of claim 1, wherein the housing further comprises: an exterior surface; and an exhaust hole connecting the exterior surface and the interior surface for discharging the air when combining the housing with the plastic base.

12. The optical sub-assembly of claim 1, wherein the plastic base further comprises: a baffle part connecting with the alignment part to touch the housing or be fixed with the housing.

13. The optical sub-assembly of claim 12, wherein the baffle part includes at least a fastening design to be fixed with a circuit board.

14. The optical sub-assembly of claim 1, further comprising: at least an aspherical lens, set inside the housing, for assisting the fiber in forming an optical connection with the at least one photoelectric component.

15. The optical sub-assembly of claim 1, further comprising a pad set between the at least one photoelectric component and the upper surface.

16. An optical sub-assembly comprising:
   a plastic base which is an integral whole made through a plastic molding process and includes:
      an upper surface; and
      a side surface including a curved side surface and a planar side surface while the entire border of the upper surface is a partial border of the side surface;
   at least one photoelectric component set upon or above the upper surface of the plastic base for optically connecting to a fiber; and
   a housing including:
      a window for inserting the fiber to carry out optical coupling with the at least one photoelectric component; and
      an interior surface defining an accommodation room and including a curved interior surface and a planar interior surface,
   wherein the accommodation room is capable of containing at least some of the plastic base and covering at least a part of the side surface while the curved interior surface closely meets the curved side surface and the planar interior surface closely meets the planar side surface.

17. An optical sub-assembly packaging method, comprising the following steps:
   providing a plastic base including an alignment part which includes:
      an upper surface; and
      a side surface including a first surface and a second surface which are curved and planar respectively;

setting at least one photoelectric component upon or above the upper surface of the plastic base; and providing a housing, made of material pervious to light, including:
- a window for inserting a fiber to carry out optical coupling with the at least one photoelectric component; and
- an interior surface defining an accommodation room and including a third surface and a fourth surface which are curved and planar respectively, wherein the accommodation room is capable of containing at least some of the plastic base and covering at least a part of the side surface; and making the accommodation room of the housing contain at least some of the alignment part of the plastic base, the curved third surface closely meet the curved first surface, and the planar fourth surface closely meet the planar second surface.

18. The optical sub-assembly packaging method of claim 17, wherein when the accommodation room is containing at least some of the plastic base, the relation between the first and third surfaces and the relation between the second and fourth surfaces forbid the housing to rotate or transversely shift in relation to the plastic base.

19. The optical sub-assembly packaging method of claim 17, further comprising the following steps: setting a pad upon or above the upper surface, wherein the at least one photoelectric component is set on the pad.

20. The optical sub-assembly packaging method of claim 17, further comprising the following steps: setting at least an aspherical lens inside the housing to allow the at least one photoelectric to optically connect with the fiber through the aspherical lens.

21. The optical sub-assembly packaging method of claim 17, further comprising the following steps: coating at least some of the plastic base and/or the housing with glue sensitive to ultraviolet rays.

22. The optical sub-assembly packaging method of claim 21, further comprising the following steps: after making the housing cover at least some of the alignment part, fixing at least some of the plastic base to at least some of the housing with the glue through an ultraviolet processing step.

23. The optical sub-assembly packaging method of claim 17, wherein the steps of providing the plastic base and/or the housing is carried out by a plastic molding process.

24. The optical sub-assembly packaging method of claim 17, wherein the step of making the housing covers at least some of the alignment part comprises: using a detecting device to detect the border of the plastic base and thereby generate a detection result; and making the housing cover at least some of the alignment part according to the detection result.

* * * * *